United States Patent [19]

Boodman et al.

[11] 4,314,160
[45] Feb. 2, 1982

[54] WIND TURBINE GENERATOR FOR ELECTRICAL POWERED VEHICLES

[76] Inventors: Leon Boodman, 1445 Brooklyn Blvd., Bay Shore, N.Y. 11706; James P. Malone, 1 Odell Ct., Syosset, N.Y. 11791

[21] Appl. No.: 143,754

[22] Filed: Apr. 25, 1980

[51] Int. Cl.³ .................. B60K 1/00; F03D 9/02
[52] U.S. Cl. .................. 290/55; 180/65 DD
[58] Field of Search ............. 290/44, 55, 8, 9, 14–17; 180/65 DD

[56] References Cited

U.S. PATENT DOCUMENTS

| 757,800 | 4/1904 | Williams | 290/55 |
|---|---|---|---|
| 3,556,239 | 1/1971 | Spahn | 290/44 |

FOREIGN PATENT DOCUMENTS

| 877563 | 12/1942 | France | 180/65 DD |
|---|---|---|---|
| 572826 | 2/1976 | Switzerland | 290/55 |
| 2013597 | 8/1979 | United Kingdom | 290/55 |

Primary Examiner—R. L. Moses
Assistant Examiner—Shelley Wade
Attorney, Agent, or Firm—James P. Malone

[57] ABSTRACT

Means to provide additional electrical power in an electrically powered vehicle. An air scoop is mounted on the vehicle. The air scoop opens in a generally forward direction. A turbine wheel is mounted in the rear of the air scoop. An electric generator is connected to the turbine wheel, whereby air passing through the air scoop will generate additional electricity for the vehicle batteries. The air scoop is rotatable and means are provided to lock it in position.

3 Claims, 2 Drawing Figures

WIND TURBINE GENERATOR FOR ELECTRICAL POWERED VEHICLES

TECHNICAL FIELD

This invention relates to electrically powered vehicles and more particularly to wind turbine generators for enhancing the electrical generator capacity.

BACKGROUND ART

The use of electrical powered vehicles is increasing in view of the energy crisis.

Conventional electrical powered vehicles are powered by batteries which must be charged frequently. The size limitation and the limited electrical capacities of the batteries severly limits the cruising range of the vehicle. Typical conventional electrical powered vehicles have a range, for instance, of a fifty mile travel range before requiring recharging.

THE INVENTION

The present invention will provide additional generator capacity while the vehicle is in operation which will extend the cruising range of the electrically powered vehicle.

The present invention provides means to provide additional electrical power in an electrically powered vehicle. An air scoop is mounted on the vehicle. The air scoop opens in a generally forward direction. A turbine wheel is mounted in the rear of the air scoop. An electric generator is connected to the turbine wheel, whereby air passing through the air scoop will generate additional electricity for the vehicle batteries.

OBJECTS OF THE INVENTION

Accordingly, a principal object of the invention is to provide a new and improved generator means for electrically powered vehicles.

Another object of the invention is to provide means for utilizing wind power for increasing the generating capacity of electrically powered vehicles.

Another object of the invention is to provide additional electrical power comprising: an air scoop mounted on the vehicle, the air scoop opening in a generally forward direction, a turbine wheel mounted in the rear of the air scoop, and an electric generator connected to the turbine wheel, whereby air passing through the air scoop will generate additional electricity for the vehicle batteries.

These and other objects of the invention will be apparent from the following specification and drawings of which:

BEST MODE OF THE INVENTION

Figures 1, 2:
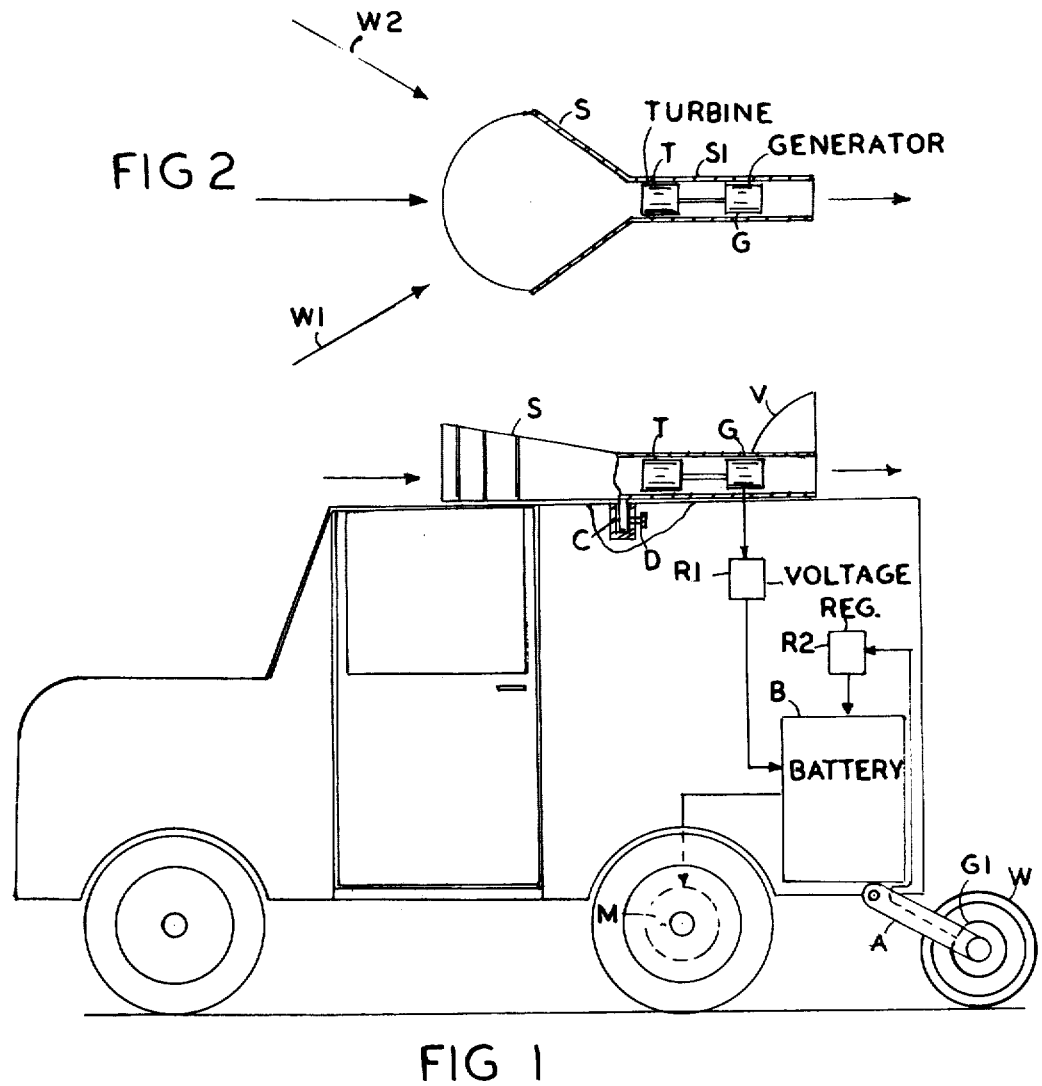
FIG. 1 is a side view illustrating an embodiment of the invention.
FIG. 2 is a partial top view of FIG. 1.

Referring to the drawings, FIG. 1 shows a conventional electrically powered vehicle having a fairly large set of batteries B, which are connected to the motor M, which is connected to power the vehicle.

The present invention provides electrical generation while the vehicle is in motion. An air scoop S is mounted on top of the vehicle, facing in a generally forward direction. The turbine wheel T is mounted in the extending channel S1 of the air scoop. A generator G is mounted in the extending channel S1 and connected to the wind turbine T. The output of the generator is connected to the batteries B in order to recharge the batteries while the vehicle is being operated.

While the vehicle is going forward, air will enter the forward portion of the air scoop and pass through, turning the turbine wheel T. The forward face of the air scoop is preferably curved over an arc of approximately 180° in order to receive any cross winds, W1 and W2, which may prevail. The wind turbine generator of the vehicle will operate at all times while the vehicle is going forward and will be especially efficient when the vehicle is decelerating or going down hills or in the presence of favorably directed cross-winds, such as illustrated at W1 and W2 in detail top view of FIG. 2.

In a modification of the invention, a fifth wheel W, may be mounted on the vehicle by means of a shaft A, pivotally mounted to the frame of the vehicle. The fifth wheel has a wheel generator G1, which is connected to provide electrical energy to the battery B. This modification of the invention will provide additional electric power while the vehicle is operating and will be especially efficient when the vehicle is decelerating or going down hill.

The connections between the generators and the battery may be made through conventional voltage regulators R1, and R2, so as to adjust for different voltages that may be put out by the generators operating at varying speeds.

Additional air scoop assemblies may be mounted on the sides of the vehicle. Other wind driven wheels may be used instead of turbines.

The vehicle may be parked facing the wind at night or at any time for recharging. When parked, the air scoop may be made rotatable on shaft A to catch the wind and may have an air vane V to point it into the wind when the vehicle is parked. When the vehicle is in motion, the shaft C is locked by the set screw D.

It is claimed:

1. In a vehicle having electrical battery powered means,
    means to provide additional electrical power comprising:
        an air scoop rotatably mounted on top of the vehicle,
        a wind driven turbine wheel mounted in the rear of the air scoop and,
        an electric generator connected to the turbine wheel,
        and means to lock the rotatable air scoop in position,
    whereby air passing through the air scoop will generate additional electricity for the vehicle battery.

2. Apparatus as in claim 1 wherein the opening of the air scoop is curved over an arc of a substantial portion of a circle.

3. In an electrical battery powered vehicle, means to provide additional electrical power comprising:
    an air scoop rotatably mounted on top of the vehicle,
    a wind driven turbine wheel mounted in the rear of the air scoop and,
    an electric generator connected to the turbine wheel,
    and means to lock the rotatable air scoop in position,
    whereby air passing through the air scoop will generate additional electricity for the vehicle batteries.

* * * * *